UNITED STATES PATENT OFFICE.

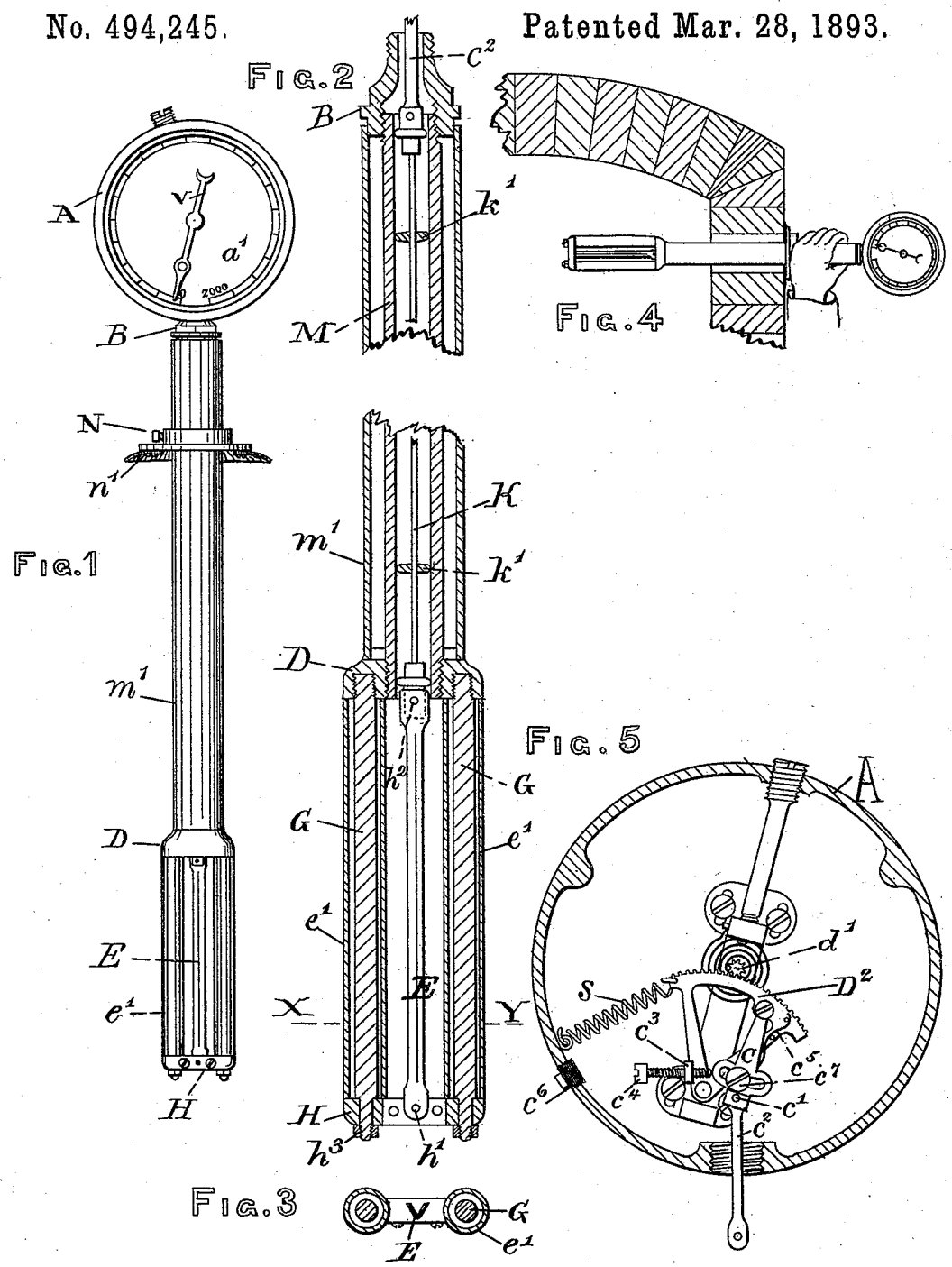

EDWARD BROWN, OF PHILADELPHIA, PENNSYLVANIA.

PYROMETER.

SPECIFICATION forming part of Letters Patent No. 494,245, dated March 28, 1893.

Application filed April 19, 1892. Serial No. 429,800. (No model.)

*To all whom it may concern:*

Be it known that I, EDWARD BROWN, a citizen of the United States, residing at Philadelphia, in the county of Philadelphia and State of Pennsylvania, have invented a new and useful Pyrometer, of which the following is a specification.

My invention relates to the construction of pyrometers which have a long stem projecting into the medium, the temperature of which is to be indicated, which stem is secured to a case containing the multiplying mechanism pointer and dial. To give sufficient rigidity and strength, this style of stem pyrometer is usually made with somewhat heavy or thick walls; and especially is this necessary when the pyrometer is employed to indicate the temperature of gases above red heat; a red heat being very destructive in its oxidizing effect upon the metals which are most easily available, and the stem in a few weeks or months becomes bent or eaten away, or the structure of the material entirely altered and useless. Again, in this style of pyrometer the stem is made of two materials having a different rate of elongation, when heated, and is only accurate when the stem as a whole has been inserted in the heated medium a sufficient time to acquire a uniform temperature throughout its parts which takes from ten to twenty minutes, too long a time to be spared by a workman and consequently the pyrometer is only used as a fixed or stationary pyrometer.

For a general description of this style of pyrometer see my patent of December 4, 1888, No. 393,962.

In the invention I will now describe, I make this stem pyrometer to indicate accurately in half a minute, or, less, the temperature of red hot gases or, fluids. This is done by making the stem substantially in two parts: The head containing the indicating mechanism, is connected by a long and heavy piece of iron tubing to a heavy iron frame carrying an expansion bar of very thin metal. By this means I am able to introduce into the center of a heating furnace at a white heat, a strip of platinum or other refractory metal, and measure in a few seconds the motion due to its expansion, before the heavy metal frame has received sufficient heat to materially expand it and affect the indication.

Features in this instrument different from any previous invention are these; the expansion bar and the frame or fulcrum to which it is attached may both be of the same material, such as iron. Also the mechanism in the head is so adjusted as to show the temperature when the expansion bar arrives at its full maximum heat; for it is evident that, should the stem be kept in the heat until it is all evenly heated, the pointer must return again to the temperature at which it originally started.

I am by this invention able to use a smaller quantity of metal such as platinum; and to indicate the white hot temperature of a heating furnace in a few seconds and without injury to the metals employed.

In the accompanying drawings, Figure 1 is a general view of the pyrometer as a whole. Fig. 2 is a section through the stem of the pyrometer. Fig. 3 is a section on line $x\ y$. Fig. 4 shows the pyrometer when introduced within a furnace. Fig. 5 shows the interior mechanism of the pyrometer head.

In Fig. 1. is seen the head A which carries the dial $a'$ and pointer V, which is actuated by the difference in expansion of the parts of the stem.

B is a socket uniting the head to the stem. The mechanism within the head is shown in Fig. 5.

$D^2$ is the toothed segment gearing into the pinion $d'$ which carries the pointer. On this segment is hinged the adjusting arm C. A pin $c'$ connects the link $c^2$ with the sliding rod K within the stem. A stud $c^3$ projects from the segment through which stud the screw $c^4$ passes, and presses against the arm C. A spring $c^5$ keeps the arm in contact with the screw. An opening is made in the case at $c^6$ through which I insert a screw driver to turn the screw $c^4$, and by this I regulate the radius of the pin $c'$ without removing the glass, pointer, or dial. The arm C is secured permanently by the set screw $c^7$. The pyrometer head carrying this mechanism is secured to the stem by the coupling B.

The stem shown in Fig. 2 is constructed of a heavy pipe M to give strength and rigidity when inserted through a two foot wall into a red hot furnace. The lower end of this pipe is screwed into a cross bar D. Into this cross bar I screw one or more heavy iron rods G, and at the other end of these rods I secure the cross bar H by means of nuts $h^3$. Within this rectangular frame is suspended the expansion bar E, by means of the eye bolts $h'$ $h^2$. The upper eye bolt connects the bar with the sliding rod K. Upon this rod are buttons $k'$ which steady the rod centrally and making a light rod with very little friction. The upper end of this rod is attached to the link $c^2$, and by this means the expansion of the bar E is communicated to the mechanism in the head and thence to the pointer V. To give additional strength and rigidity I make the thin expansion bar E angular or convex as shown in Fig. 3. Also to save material in the expansion bar I keep it under tension by the spring S. By making the expansion bar E heavier and placing the spring S on the opposite side of the quadrant the mechanism may be used to compress the bar instead of having it under tension.

To maintain greater accuracy in the instrument I cover the iron rods G with asbestos, and outside this I place an iron tube $e'$. I also cover the tube M with asbestos paper, and place another heavy tube $m'$ outside of it. The asbestos covering the rod G and tube M is not shown in the drawings. The effect of this is such, that in fifteen seconds the expansion bar E may be heated to the full temperature of the furnace, perhaps 2,000°, Fahrenheit, in which time the rod G will acquire very little heat, probably not over 100°, and the tube M still less heat. The tube $e'$ is of such a thickness as to acquire a temperature intermediate between the expansion bar E and rod G, thus preventing the cooling effect of the rod G upon the expansion bar E.

To prevent the access of cold air to the furnace, I place upon the stem a sliding collar N upon the face of which is secured an elastic disk as shown in section at $n'$. This collar is secured at any position on the stem by a set screw. The operation of the pyrometer is in this manner.

The pyrometer having been introduced into the furnace, as shown in Fig. 4 the expansion bar is heated to the full temperature of the furnace (we will suppose 2,000°) in fifteen seconds:—at which time the heat has penetrated to the rods G which begin to expand, and thereby return the pointer V gradually back to its starting point providing the expansion bar and the side bars are of the same material, as iron. The arm C of the mechanism is so adjusted in this case, that the pointer indicates 2,000°, which is its maximum position before it begins to return.

The pyrometer works well with only one rod G and the bottom cross bar H; though I use two rods G the better to protect the expansion bar from injury.

I do not restrict myself to the use of iron only for the lower frame; a refractory and fragile material like firebrick may be used for the side bars with advantage provided the instrument is handled more carefully, the principle of construction being to introduce into the furnace a relatively very light or thin expansion bar of highly refractory metal which shall be exposed to and which shall acquire the full temperature of the furnace, before the heavy frame which carries it is materially elongated by the heat.

I claim—

1. In a pyrometer, the combination of the head A carrying the indicating mechanism, the heavy tube M, the expansion bar E, secured within the frame D G H, and the sliding rod K which communicates the expansion of the said bar to the indicating mechanism.

2. In a pyrometer, the combination of the expansion strip E pivoted within the frame at the end of the tube M, mechanism within the case A connected with the said strip and adjusted to indicate the correct temperature when the pointer V first arrives at its maximum position.

3. In a pyrometer stem, the combination of the heavy tube M the sliding rod K, the outside case $m'$, the expansion strip E within the frame D G H, and the outside tube $e'$.

4. In a pyrometer stem, the combination of the convex expansion strip E pivoted at $h'$ to the frame H. G. D, the sliding rod K by which the expansion of the said strip is communicated to the mechanism within the head A.

5. In a pyrometer stem, the combination of the expansion strip E of very light weight relatively to the frame D G H which carries it, the tube M and sliding rod K, operating substantially as described.

6. The adjusting mechanism within the case A consisting of a pinion $d'$, a toothed segment $D^2$ carrying the adjusting arm C, the screw $c^4$, the spring $c^5$, the case A and opening $c^6$ in the said case.

EDWARD BROWN.

Witnesses:
FELIX HAAC,
JOHN F. GRANT.